US011862132B2

(12) United States Patent
Helbert et al.

(10) Patent No.: US 11,862,132 B2
(45) Date of Patent: Jan. 2, 2024

(54) MUSICAL DEVICE AND ASSOCIATED METHOD

(71) Applicant: CONCERTI, Caen (FR)

(72) Inventors: Karine Helbert, Mondeville (FR); Christophe Brunet, Hérouville (FR); Melanie Paiola, Caen (FR)

(73) Assignee: CONCERTI, Caen (FR)

( * ) Notice: Subject to any disclaimer, the term of this patent is extended or adjusted under 35 U.S.C. 154(b) by 58 days.

(21) Appl. No.: 17/910,945

(22) PCT Filed: Mar. 9, 2021

(86) PCT No.: PCT/EP2021/055940
§ 371 (c)(1),
(2) Date: Sep. 12, 2022

(87) PCT Pub. No.: WO2021/180734
PCT Pub. Date: Sep. 16, 2021

(65) Prior Publication Data

US 2023/0122747 A1 Apr. 20, 2023

(30) Foreign Application Priority Data

Mar. 10, 2020 (FR) ...................................... 2002374

(51) Int. Cl.
*G10H 1/00* (2006.01)
*G10H 1/32* (2006.01)

(52) U.S. Cl.
CPC ............ *G10H 1/0008* (2013.01); *G10H 1/32* (2013.01); *G10H 2220/521* (2013.01); *G10H 2240/325* (2013.01)

(58) Field of Classification Search
CPC .. G10H 1/0008; G10H 1/32; G10H 2220/521; G10H 2240/325
See application file for complete search history.

(56) References Cited

U.S. PATENT DOCUMENTS 5,349,129 A 9/1994 Wisniewski et al.
6,353,168 B1 3/2002 Sosoka et al.
(Continued)

FOREIGN PATENT DOCUMENTS

EP 1 515 328 A2 3/2005

OTHER PUBLICATIONS

Written Opinion of the International Searching Authority as issued in International Patent Application No. PCT/EP2021/055940, dated Jun. 9, 2021.

(Continued)

*Primary Examiner* — Jianchun Qin
(74) *Attorney, Agent, or Firm* — Pillsbury Winthrop Shaw Pitman LLP

(57) ABSTRACT

A musical device includes a frame including a plurality of receptacles for receiving three-dimensional parts each having a face capable of swapping between at least two orientations in the receptacle; each part including an indexing element of the orientation of the part among at least two orientations, a plurality of detectors, each detector being associated with a receptacle to determine orientation of the part by detecting an indexing element in its receptacle, at least one audio system, inserting at least two parts into their respective receptacles triggering the sound diffusion by the audio system of at least two given music tracks simultaneously based on each of the orientations of said parts determined; the device further including a calculation system to ensure synchronization of the music tracks, soundly diffused simultaneously.

11 Claims, 6 Drawing Sheets

(56) References Cited

U.S. PATENT DOCUMENTS

| | | | | |
|---|---|---|---|---|
| 6,991,509 | B1 | 1/2006 | Carley et al. | |
| 8,420,923 | B1 * | 4/2013 | Choi | G10H 1/18 84/476 |
| RE48,417 | E * | 2/2021 | Marks | A63F 13/215 |
| 2003/0129572 | A1 * | 7/2003 | Shuler | A63H 5/00 434/317 |
| 2013/0305903 | A1 | 11/2013 | Fong et al. | |

OTHER PUBLICATIONS

International Search Report as issued in International Patent Application No. PCT/EP2021/055940, dated Jun. 9, 2021.

* cited by examiner

MUSICAL DEVICE AND ASSOCIATED METHOD

CROSS-REFERENCE TO RELATED APPLICATIONS

This application is the U.S. National Stage of PCT/EP2021/055940, filed Mar. 9, 2021, which in turn claims priority to French patent application number 2002374 filed Mar. 10, 2020. The content of these applications are incorporated herein by reference in their entireties.

FIELD OF THE INVENTION

The field of invention relates to musical devices and methods for playing music sequences.

STATE OF THE ART

There are many musical devices available, especially for children.

For example, devices for generation when the child presses specific buttons are known. However, the child only associates a button with a sound and does not develop musical awakening.

U.S. Pat. No. 5,349,129 describes an electronic musical device for generating notes or musical phrases. This device proposes placing modular elements on a support. Each modular element is associated with a musical note. When playing, the device plays the notes one after the other according to the modular elements placed on the support and their order on the support.

One drawback of this device is that it only allows one melody to be generated at a time. In addition, this device does not allow the child to change composition in real time. He/she has to make a composition, listen to it, and then modify it once the sequence is generated.

U.S. Pat. No. 8,420,923 describes a children's musical device in which a plurality of music tracks can be played simultaneously. Each music track corresponds to the score of a musical instrument in a symphonic composition. The device consists of a plurality of parts, each representing a musical instrument. When the user places a part on a particular surface, the musical sequence associated with that instrument is played. The user can then add or remove parts from the support to stop or add a music track associated with an instrument.

While this device is useful for identifying or recognizing the sound of an instrument in a symphonic composition, the drawback of this device is that the user remains passive and does not have the ability to modify an instrument's track or participate in music creation.

SUMMARY

The present invention aims at solving the aforementioned drawbacks.

According to a first aspect, the invention relates to a musical device comprising:

- a frame comprising
  - a plurality of receptacles for receiving three-dimensional parts each comprising a face capable of swapping between at least two orientations in said receptacle; each part comprising an element for indexing the orientation of the part among at least two orientations,
  - a plurality of detectors, each detector being associated with a receptacle to determine orientation of the part by detecting an indexing element in its receptacle, and
- at least one audio system.

Inserting at least two parts into their respective receptacles triggering sound diffusion of at least two music tracks simultaneously by the audio system. Said particular music tracks being selected from a set of music tracks according to each of the orientations of said parts determined, and optionally according to each receptacle into which said parts are inserted. The device further comprising a calculation system to ensure synchronization of music tracks simultaneously soundly diffused.

According to one embodiment, the triggering of the sound diffusion is carried out by a calculator receiving indicators of orientation and/or presence of one or more parts within a receptacle of the frame. The calculator can be integrated into the audio system, for example. According to another embodiment, the calculator is a calculator dissociated from the audio system. In the latter case, the calculator delivers instructions aiming at communicating a playback mode to the audio system, such as to activate sound diffusion of a track or mute it. According to one embodiment, the calculator receives or queries at regular intervals digital statuses of a memory representative of the presence or absence of one or more parts in a receptacle and its orientation in the receptacle. This memory is, for example, coupled with the detectors to record the measurements of each detector at regular intervals. Said calculator or the calculation system is connected to the audio system.

A first advantage is to allow synchronous sound diffusion of two selected music tracks from the placement and orientation of a part in a receptacle, especially without changing the contact face. The user can thus modify one of the music tracks by swapping the orientation of a part.

A second advantage is to synchronize music tracks. In this way, the second track is soundly diffused so that the playback locations of the first and second track match. Thus, there is no need to resume the first track from the beginning, as the second track is soundly diffused so that its notes blend into the melody of the first track.

In one embodiment, each receptacle comprises a receiving cavity forming a geometric shape for receiving a part of a predefined geometric shape, preferably in several orientations of the part.

In one embodiment, the frame comprises recesses for receiving a receptacle in a removable manner, and in that each receptacle comprises a receiving cavity forming a geometric shape for receiving a part of a predefined shape, preferably in several orientations of the part.

One advantage is that parts can be drawn so that a part can only cooperate with one receptacle.

In one embodiment, the plurality of detectors comprises a plurality of Hall effect sensors and in that the indexing elements comprise permanent magnets.

One advantage of a permanent magnet and Hall effect sensors is to provide a detection means that is not accessible on the surface of a part or the frame. Indexing elements and detectors are buried and inaccessible to the user. This reduces the risk of breakage, especially when the user is a young child. Another advantage is to provide a "passive" detection system, that is without emission of waves, light or signal between the three-dimensional part and a detector.

In one embodiment, the device includes a display means, with the calculation system being configured to such that the display means issues information about the orientation of a part in a receptacle.

One advantage is to be able to provide to the user information on which track is being soundly diffused.

In one embodiment, the device includes a memory comprising a set of music tracks or a compatible connector to receive information from such a memory.

In one embodiment, the calculation system is configured to ensure synchronization, especially of the two music tracks given, by:

simultaneously starting playing of all the music tracks in the set of music tracks;

automatically activating the volume of each track that is associated with the receptacle in which a part is engaged and with the determined orientation of said part; and deactivating the volume of the other tracks.

In one embodiment, the calculation system is configured to ensure synchronization, especially of the two music tracks given, by:

simultaneously starting playing of all the music tracks in the set of music tracks, the volume of each track being individually adjustable between at least two volumes: a first volume corresponding to a zero volume preventing sound diffusion of the track and a second volume allowing sound diffusion of said track;

adjusting the volume of all music tracks to the first volume that prevents them from being soundly diffused.

Triggering sound diffusion by the audio system of a selected music track may include automatically modifying the volume adjustment of that music track to the second volume for playback thereof.

In one embodiment, the musical device comprises a plurality of parts adapted to cooperate with said receptacles.

In one embodiment, each part has a permanent magnet arranged between the center of the part and a radial end of said part. By distal end, it is meant a zone that does not include a center of rotation of the part around which the part rotates to swap between two orientations in the receptacle.

According to a second aspect, the invention relates to a method for playing back several music tracks simultaneously and synchronously.

This method comprises the steps of:

providing a set of music tracks comprising a plurality of sub-sets of music tracks, each sub-set being associated with a receptacle of a musical device, each receptacle being designed for receiving three-dimensional parts each comprising a face capable of swapping between at least two orientations in said receptacle;

detecting the presence and an orientation of a first three-dimensional part in a first receptacle;

selecting a first music track from a first sub-set associated with said first receptacle based on the orientation of the three-dimensional part in the first receptacle;

the sound diffusion of the first music track selected;

detecting the presence and an orientation of a second three-dimensional part in a second receptacle;

selecting a second music track from a second sub-set associated with said second receptacle based on the orientation of the three-dimensional part in the second receptacle;

the sound diffusion of the second music track selected, the second music track being soundly diffused simultaneously and synchronously with the first music track.

According to one execution mode, the sound diffusion of the second music track selected is started from the time location of the first music track being soundly diffused.

According to one execution mode, synchronization of the sound diffusion of the music tracks selected is ensured by:

simultaneously starting playing of all the music tracks in the set of music tracks, the volume of each track being individually adjustable between at least two volumes: a first volume corresponding to a zero volume preventing sound diffusion of the track and a second volume allowing sound diffusion of said track;

adjusting the volume of all music tracks to the first volume preventing theme to be sound being soundly diffused;

when the first or second music track is selected, automatically modifying the volume of said first or second music track selected from the first volume to the second volume for its sound diffusion.

One advantage is to allow, when a first track is soundly diffused, the sound diffusion of a track synchronously with the first track so that these two tracks can be combined without having to make calculations on how to trigger the second track so that it can be superimposed on the first one. Here, a simple command automatically triggers the sound diffusion of a second track, with a surprisingly short response time, which will combine perfectly with the first track.

According to one execution mode, the method also comprises the steps of:

detecting swapping of the orientation of the first three-dimensional part in a second receptacle;

selecting a third music track from the first sub-set based on the new orientation of the three-dimensional part in the first receptacle;

stopping sound diffusion of the first music track;

the sound diffusion of the third music track selected.

The third music track is soundly diffused simultaneously and synchronously with the second music track.

According to one execution mode, the sound diffusion of the third music track selected is started from the time location of the second music track being soundly diffused.

According to one execution mode, stopping sound diffusion of the first music track is carried out by automatically modifying the volume adjustment of said first music track from the second volume to the first volume to stop its sound diffusion as soon as said first music track is no longer selected.

One advantage is to be able to modify one of the tracks without interrupting playing of a second track. This method advantageously allows one track to be modified by another and to be able to notice the difference on an overall symphonic melody.

According to one execution mode, the method comprises a step of simultaneously starting all tracks in the set of music tracks, preferably from the same time location. The volume of each track is individually adjustable between at least a first volume and a second volume, with the first volume corresponding to a zero volume preventing its sound diffusion and the second volume having a predetermined value generating its sound diffusion. The sound diffusion of a selected track comprising a sub-step of automatically modifying the volume of said track, from the first volume to the second volume for its sound diffusion.

This embodiment advantageously improves the response time between the selection of the music track and its sound diffusion synchronously with the first sound track.

According to a third aspect, the invention relates to a musical device including:

a frame comprising a plurality of receptacles for receiving three-dimensional parts each comprising a face capable of swapping between at least two orientations in said receptacle; each part including an indexing element of the orientation of the part among the at least two orientations, a plurality of detectors, each detector being associated with a receptacle to determine the orientation of the part via the detection of an indexing element in its receptacle, said detectors being hall effect sensors to measure at least one characteristic of a magnetic field of a magnet included in a part and forming the indexing element in order to evaluate the position and/or relative orientation of each magnet with at least one detector;

at least one audio system to generate a sound signal resulting from mixing at least two given music tracks ($M_1$, $M_2$), said music tracks being automatically selected from a set of music tracks based on the evaluated position and/or orientation of the magnet for each part inserted into a receptacle.

BRIEF DESCRIPTION OF THE FIGURES

Other characteristics and advantages of the invention will be more apparent upon reading the following detailed description, with reference to the appended figures, that illustrate:

FIG. 1 represents a perspective view of a musical device according to one embodiment of the invention.

FIG. 2 represents a perspective view of a musical device according to FIG. 1 where the parts and receptacles have been removed.

FIGS. 3A-3B represent perspective views of a musical device according to one embodiment of the invention in which the receptacles are formed by a recess in the upper surface of the frame.

FIG. 4 represents a profile view of a musical device according to one embodiment of the invention.

FIGS. 5A to 5E represent a transparent view of three-dimensional parts adapted to cooperate with the receptacles of a musical device according to one embodiment of the invention.

FIG. 6A represents a view of a receptacle cooperating with a three-dimensional part having a substantially square shape.

FIG. 6B represents a view of a receptacle according to FIG. 6A from which the three-dimensional part has been removed.

FIG. 7A represents a view of a receptacle cooperating with a three-dimensional part having a substantially circular shape.

FIG. 7B represents a view of a receptacle according to FIG. 7A from which the three-dimensional part has been removed.

FIG. 8 shows a sectional plane of a musical device according to one embodiment at a receptacle.

FIGS. 9A to 9D represent a top view of a three-dimensional part in a receptacle of the musical device according to one embodiment, in which the three-dimensional part has a different orientation on each figure.

FIG. 10 represents a schematic view of the components of a musical device according to one embodiment of the invention.

FIG. 11 represents a schematic view of an example of a set of music tracks and an example of a method for selecting a music track based on the receptacle and orientation of a part in said receptacle.

FIG. 12 represents a flowchart representing the steps of a method of the sound diffusion of two music tracks according to one example.

DETAILED DESCRIPTION

Figure 1:
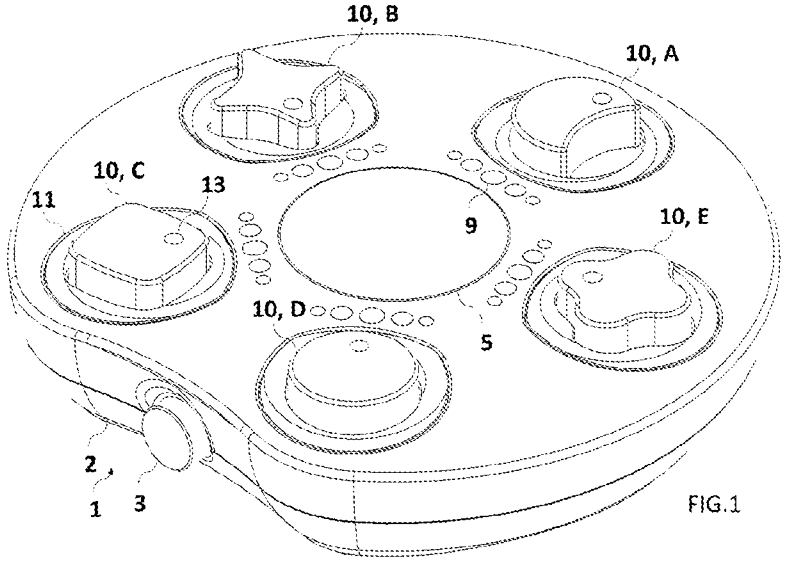
FIG. 1.
Figure 2:
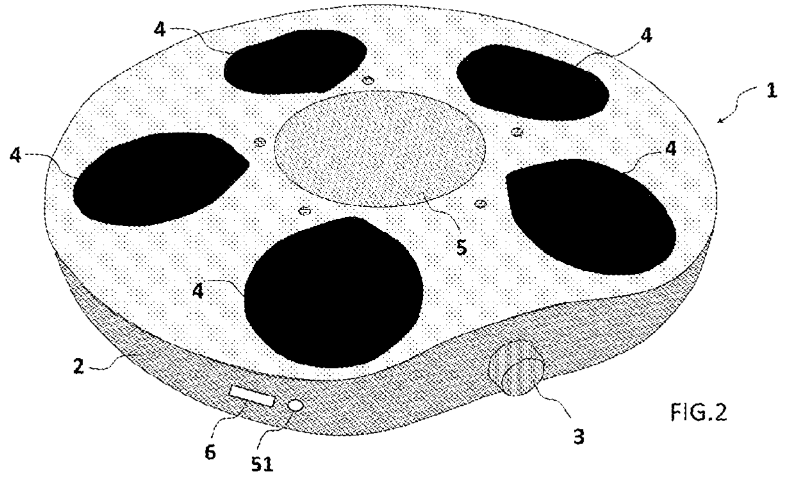
FIG. 2.

The device according to one embodiment is now described with reference to FIGS. 1 to 10.

Frame

FIGS. 1 to 4 represent a musical device according to embodiments of the invention.

Device 1 comprises a frame 2 comprising a plurality of receptacles 11 for receiving three-dimensional parts 10. The frame may comprise a one-piece structure. The frame comprises receptacles 11 for receiving three-dimensional parts 10 and an audio system 5, 51. Inserting two parts 10 into two receptacles 11 triggers the sound diffusion of two music tracks, selected based on the orientation of the parts in their receptacle, by the audio system 5, 51. Music tracks are soundly diffused simultaneously and synchronously.

In an example illustrated in FIGS. 1 to 4, frame 2 substantially has a shape of revolution. The frame can stand on a plurality of legs 20. All receptacles 11 are arranged on the upper surface 21 of the frame 2, preferably angularly equidistributed about a central axis.

Sound Output

Frame 2 further comprises an audio system for producing sound from an electrical signal. The audio system may comprise an amplifier. The audio system also includes a loudspeaker or speaker system 5. Preferably, the loudspeaker or speaker system 5 is arranged in the center of the frame 2. In one example shown in FIGS. 1 to 3B, the frame 2 comprises a central cavity comprising a speaker system 5 which can be protected by a speaker grid. Receptacles 11 are preferably arranged around the speaker grid.

In one complementary or alternative embodiment, the audio system includes an audio output interface 51. Audio output interface 51 allows an offset speaker to be connected to the frame. The audio output interface 51 consists of, for example, an electrical socket or a jack socket. The audio output interface 51 enables, for example, the musical device 1 to be connected to an offset speaker or to a headset or headphones. In another embodiment, the audio output interface 51 is an interface for connection to a wireless audio device (speaker, headset, headphones), for example via a Bluetooth connection.

Receptacles

Receptacles 11 are designed to receive three-dimensional parts 10 described later in the description. Receptacles 11 have a receiving cavity for cooperating with a three-dimensional part 10 by inserting said part 10 into said cavity.

Figure 3A:
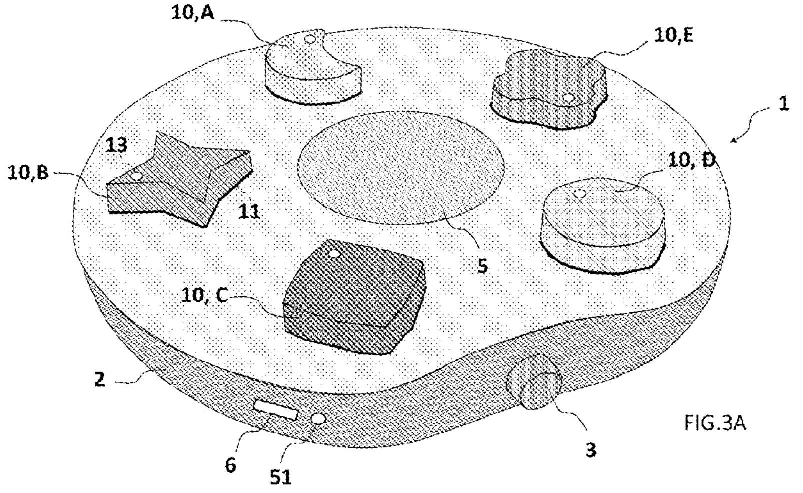
FIGS. 3A-3B.
Figure 3B:
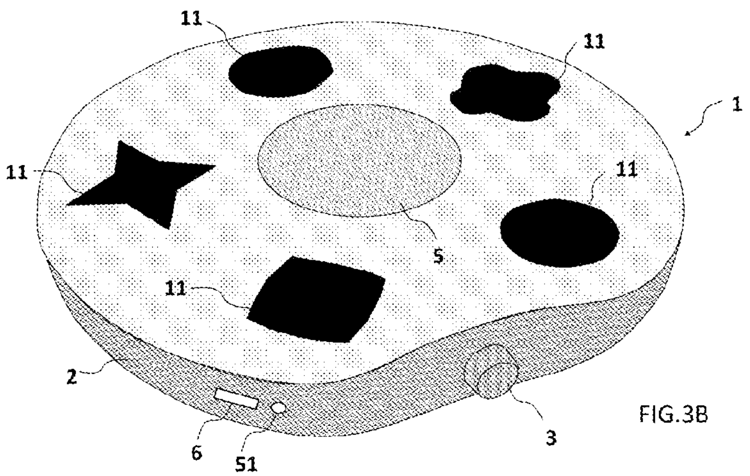
Figure 4:
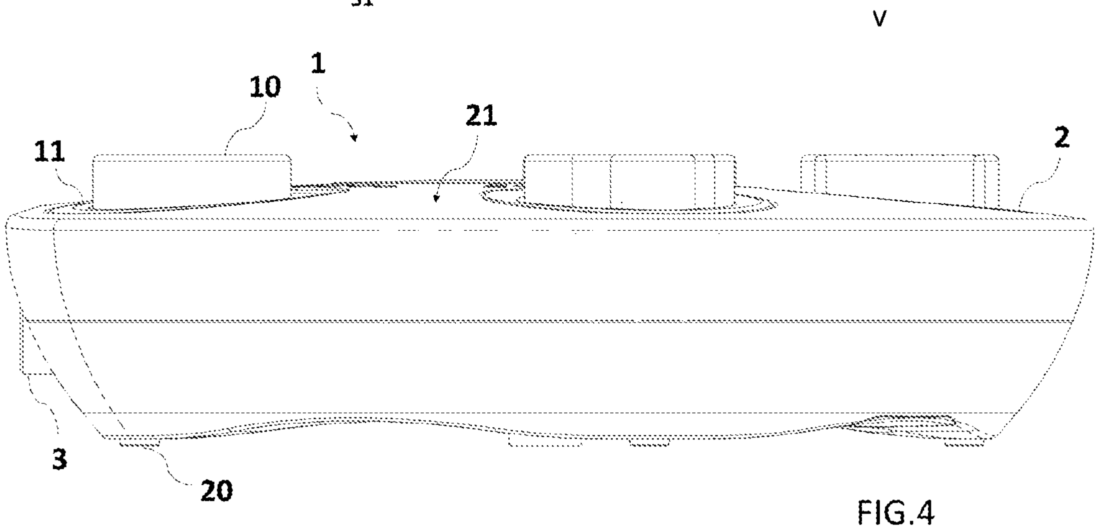
FIG. 4.

In the first embodiment illustrated in FIG. 3A and FIG. 3B, the receptacles 11 can be provided by a recess in the frame 2.

Figure 6B:
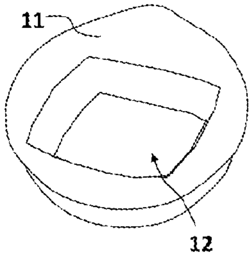
FIG. 6B.
Figure 6A:
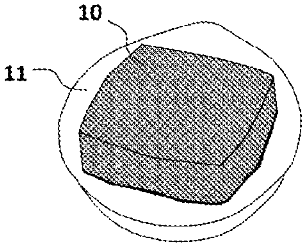
FIG. 6A.
Figure 7B:
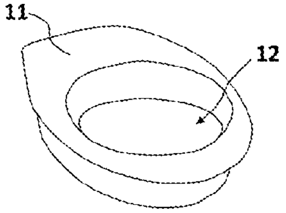
FIG. 7B.

In a second alternative embodiment, illustrated in FIGS. 1, 2 and 6A to 7B, receptacles 11 are removable relative to frame 2. Frame 2 comprises recesses 4. Each recess 4 is designed to receive one receptacle 11. Each receptacle 11 can be removably integrated into the recess 4. Recess 4 may comprise means for cooperating with receptacle 11. The cooperation means make it possible to keep the receptacle 11 inside recess 4. Each receptacle 11 has a shape for cooperating with a face of at least one three-dimensional part 10. Receptacle 11 includes a bottom 12 for receiving the three-dimensional part. As illustrated in FIGS. 6A through 6B, the bottom 12 of receptacle 11 is to receive a three-dimensional part 10 or to cooperate with a face of at least one three-dimensional part 10.

One advantage of the removable receptacles 11 in a recess 4 of the frame 2 is that the shape of the bottom of the receptacles 11 can be easily adapted. For example, a device 1 for children may include shapes of the receptacle 11 comprising star, square, crescent moon shapes. On the contrary, a device 1 for adults may comprise more neutral shapes. The receptacles 11 inserting into the recesses 4 of the frame 2 therefore allow the musical device 1 to be modulated.

In both cases, the bottom 12 of receptacle 11 has a shape cooperating with the shape of one face of the three-dimensional part 10. Receptacles 11 may also have a protrusion to the frame or be aligned with the upper surface 21 of the frame 2.

Three-Dimensional Parts

Shape of the Three-Dimensional Part

Three-dimensional parts 10 are designed to cooperate with at least one receptacle 11.

The three-dimensional parts 10 comprise a contact face 14 and an external face 15 opposite to the contact face 14. Contact face 14 is designed to cooperate with bottom 12 of a receptacle 11. The contact face 14 may comprise a shape substantially similar to the shape of the bottom 12 of a receptacle designed to cooperate with said part 10. Preferably, the contact face 14 comprises dimensions similar to or slightly smaller than the dimensions of the bottom 12 of a receptacle 11, thus allowing insertion and cooperation of the contact face 14 with the bottom of the receptacle 12.

Figure 5A:
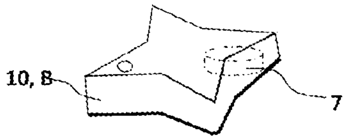
FIG. 5A, FIG. 5B, FIG. 5C, FIG. 5D, FIG. 5E.
Figure 5C:
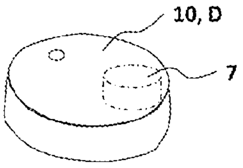
Figure 5B:
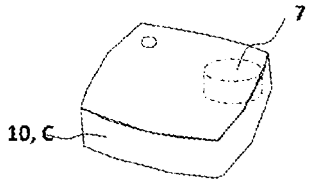
Figure 5E:
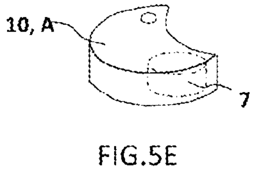
Figure 5D:
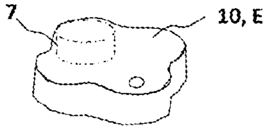
Figure 7A:
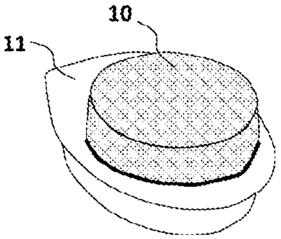
FIG. 7A.

In examples illustrated in FIGS. 5A through 5E, the contact face of the three-dimensional part may comprise a star shape (FIG. 5A), a square shape (FIG. 5B), a circular shape (FIG. 5C), a cross shape (FIG. 5D), or a crescent moon shape (FIG. 5E). Each three-dimensional part 10 may be associated with a receptacle 11 of frame 2, whose shape of the bottom 12 of receptacle 11 cooperates with the shape of the contact face 14 of said three-dimensional part 10. In another example, all parts 10 and all receptacles 11 are identical and each part 10 can cooperate with any receptacle 11.

Swapping Orientation of the Part in the Receptacle

The shapes of the contact face 14 of a three-dimensional part 10 and the shape of the bottom 12 of receptacle 11 associated with said three-dimensional part 10 cooperate by insertion.

The three-dimensional part 10 can cooperate by inserting into receptacle 11 in several different orientations. Preferably, part 10 can swap orientation in the receptacle by rotating part 10 along an axis 16 substantially perpendicular to the contact surface 14 of part 10. The axis of rotation 16 described above should be understood as an axis of rotation between two orientations of the part in the receptacle, even if this part has to be removed from the receptacle and then reinserted to swap orientation as described hereinbefore. The axis of rotation 16 may be a projection of the geometric center of the contact face into a plane perpendicular to the plane of the contact face.

In one embodiment, the shapes of receptacle 11 and three-dimensional part 10 associated therewith cooperate to lock rotational movement of said part 10 into receptacle 11. For example, if the bottom of receptacle 12 and contact surface 14 of part 10 are star, cross, or square shaped, part 10 can only swap orientation by removing part 10 and reinserting it into the receptacle in a different orientation.

Three-dimensional parts 10 preferably comprise a marker 13. Marker 13 is preferably a visual marker arranged on a zone on the external face 15 of the three-dimensional part 10. Marker 13 allows the user to view orientation of part 10 inserted into receptacle 11. The visual marker 13 is preferably arranged in a lateral zone of the external face 15, that is in a zone that does not comprise the axis of rotation 16. Marker 13 therefore advantageously enables the three-dimensional part orientation 10 in receptacle 11 to be viewed.

Figure 9A:
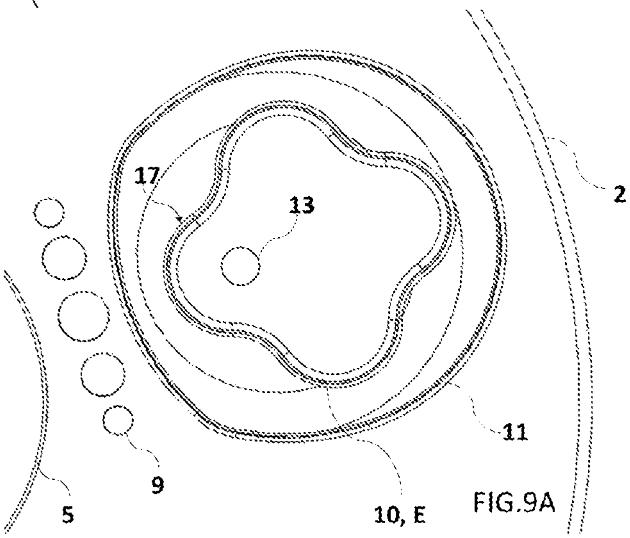
FIG. 9A, FIG. 9B, FIG. 9C, FIG. 9D.
Figure 9B:
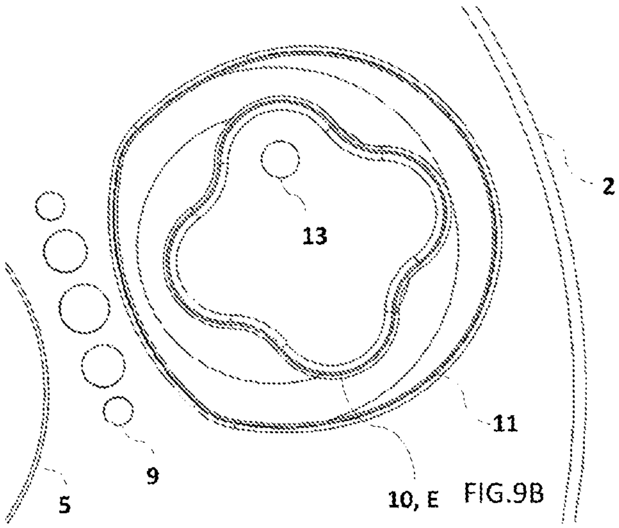
Figure 9C:
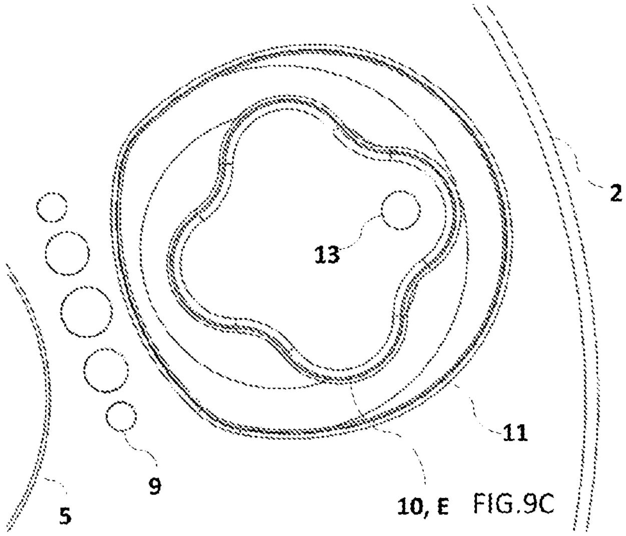
Figure 9D:
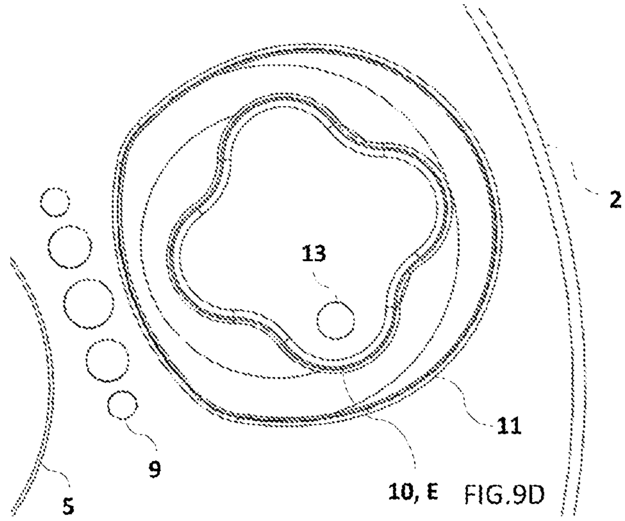
Figure 10:
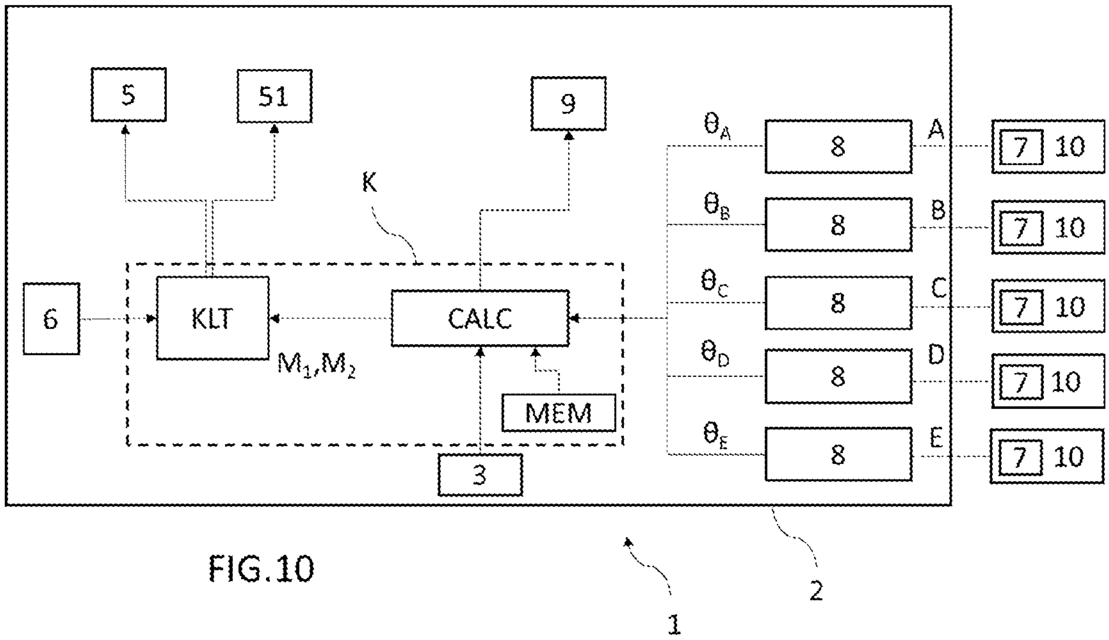
FIG. 10.

In a first example illustrated in FIGS. 9A through 9D, part 10 and receptacle 11 are cross-shaped. Marker 13 is arranged on the external face of part 10 and allows its orientation to be viewed. Such a cross shape does not allow the part 10 to rotate in its receptacle 11. Indeed, contact between the radial edges 17 of part 10 and receptacle 11 locks rotation of part 10. Part 10 should therefore be removed from receptacle 11, rotated by the user along its axis of rotation 16, then reinserted in another orientation. FIG. 9B illustrates part 10 of FIG. 9A, whose orientation in the receptacle has been swapped 90° clockwise. FIGS. 9C and 9D illustrate a 180° and 270° clockwise orientation swap of the part from FIG. 9A. Marker 13 enables this orientation swap to be viewed.

In another embodiment, the shape of part 10 and the shape of receptacle 11 permit rotation of the three-dimensional part 10 in receptacle 11, for example a circular shape or a crescent moon shape in a circular shaped receptacle.

Preferably, the height of the three-dimensional part 10 is greater than the height of the receiving cavity of the receptacle 11. The three-dimensional part thus protrudes from the upper surface 21 of the frame 2 or from the receptacle 11. This protrusion makes it easier to grip a part 10 inserted into a receptacle 11. It will be understood that the height of part 10 can be defined by the distance between the contact face 14 and the external face of part 15.

Indexing Element

Musical device 1 can detect orientations of parts 10 in receptacles 11 in order to select a music track according to the orientation detected.

As illustrated in FIGS. 5A to 5E, each three-dimensional part 10 comprises an indexing element 7. Frame 2 comprises a plurality of detectors 8. Each detector is associated with a receptacle 11 to determine the orientation of the part 10 through the detection of indexing element 7 in said receptacle.

Indexing element 7 allows cooperation with at least one detector 8 of frame 2 associated with the receptacle to determine orientation of the part in the receptacle. Detector 8 and indexing element 7 can be chosen so that detector 8 can detect the presence of indexing element 7 and/or can detect a quantity representative of the distance between indexing element 7 and said detector 8.

Figure 8:
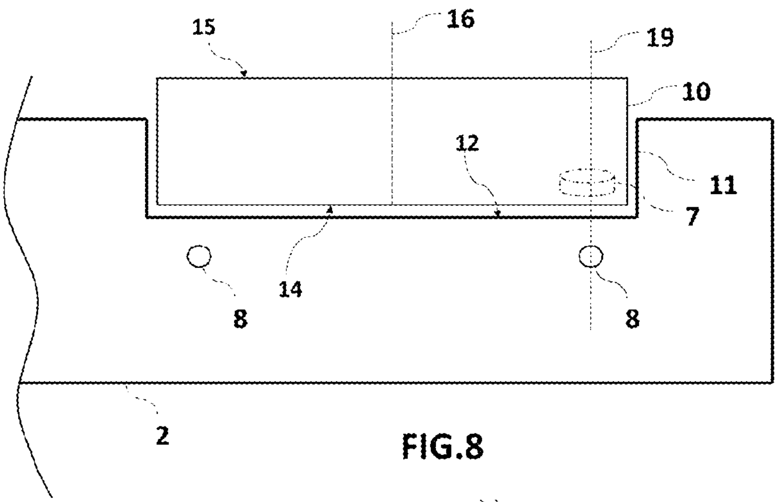
FIG. 8.

FIG. 8 is a cross-section view of part of the frame 2 illustrating a receptacle 11/part 10 pair. In this figure, 3 detectors 8 associated with the represented receptacle 11 are represented.

Indexing element 7 is preferably arranged within the volume of part 10. Such an arrangement advantageously enables the indexing element 7 to be protected from user manipulation. Indeed, parts 10 are intended to be extensively manipulated by the user. The risk of damage to the indexing element 7 is advantageously reduced, in particular when the user is a young child.

Indexing element 7 is preferably arranged in a side zone of part 10. Especially, the indexing element 7 is arranged in a zone not comprising the axis of rotation 16 of part 10 in receptacle 11. Due to its offset position in relation to the axis of rotation 16, rotation of the three-dimensional part 10 advantageously results in to a position change of the indexing element 7 relative to the frame 2 (in the same way as the marker illustrated in FIGS. 9A to 9D). By determining position of the indexing element 7 in relation to the frame 2, it is advantageously possible to determine orientation of the three-dimensional part 10 in receptacle 11.

The detector(s) 8 associated with a receptacle are arranged to determine orientation of the three-dimensional part 10 in said receptacle 11 via the detection of the indexing element 7.

In one example, at least 3 detectors are associated with a receptacle 11 and one of the detectors 8 is not on a segment connecting the other two detectors 8. Such a number and arrangement of the detectors advantageously enables position of the indexing element 7 to be determined by triangulation.

In another example, the number of detectors 8 associated with each receptacle 11 is equal to the possible number of orientations of part 10 in receptacle 11 or equal to the number of orientations desired to be detected. Preferably, as illustrated in FIG. 8, each detector 8 is arranged in frame 2 in a zone comprising projection 19 of the expected position of an indexing element 7 in relation to the plane of the contact surface 14 or the bottom 12. Thus, each detector 8 can be arranged below a position that the indexing element 7 would take in one orientation of part 10. Such a large number and arrangement of detectors advantageously enable the orientation of part 10 in relation to the detector sensing the best response to be determined.

In a first preferred embodiment, the indexing element 7 comprises a permanent magnet and the detectors 8 comprise Hall effect sensors. Hall effect sensors advantageously enable a magnetic field change, which is representative of the distance to said permanent magnet, to be measured.

Thus, one or more Hall sensors can be associated with each receptacle 11. In an example illustrated in FIG. 8, these Hall effect sensors 8 are located in frame 2 under the bottom 12 of receptacle 11.

The Hall sensors are distributed so as to estimate a position of the indexing element 7 according to the magnetic field detected by each Hall sensor.

One advantage of a permanent magnet and Hall effect sensors is to provide a detection means that is not accessible on the surface of a part or the frame. Indexing elements 7 and detectors 8 are buried and inaccessible to the user. This reduces the risk of breakage, especially when the user is a young child. Another advantage is to provide a "passive" detection system, that is without emission of waves, light or signal between the three-dimensional part 10 and a detector 8.

In another alternative embodiment not represented, the plurality of detectors 8 comprises lasers and optical detection means disposed at different zones of the bottom 12 and the indexing element 7 comprises a reflective means to reflect laser light to an optical detection means when the part swaps into a predetermined orientation.

In another alternative embodiment not represented, the indexing element includes a signal emitter and the detectors comprise signal receivers to estimate the emitter position based on the signals received. The signal emitted from the indexing element can be generated by the indexing element or it can be a signal reflected by the indexing element.

Inserted Face

In one embodiment mode, musical device 1 is designed so that detection of the orientation of the three-dimensional part 10 is also possible when part 10 is inserted into the receptacle 11 by any of the external face 15 and contact face 14. For this, the indexing means 7 can be arranged in such a way that it is detected by the plurality of detectors 8 when part 10 is inserted in both directions. Part 10 may also comprise a second indexing means similar to the first indexing means to be detected by the plurality of detectors 8 when part 1 is inserted into receptacle 11 from the external face 15. One advantage is that part 10 can be used in both directions to make it easier to use, for example for young children.

Optionally, the plurality of receivers 8 enables orientation of part 10 in its receptacle and the direction of part 10 in its receptacle to be determined by detecting an indexing element 7. The advantage of this option is that from a single receptacle 11/part 10 pair, it is possible to double the number of possible orientations.

Recognition of the Three-Dimensional Part

In one embodiment, musical device 1 allows detection of an identifier of the three-dimensional part 10 inserted into a receptacle 11. The three-dimensional parts 10 thereby comprise an identification element. This identification element makes it possible to recognize the identifier of a three-dimensional part 10 inserted into a receptacle. Determining the identification of a part 10 in a receptacle 11 advantageously enables the number of selectable tracks M from a receptacle 11 to be increased. The track M to be soundly diffused will then be selected from receptacle 11, the orientation of part 10 and based on part 10 that has been inserted into said receptacle 11. This embodiment is particularly advantageous when the shapes of parts 10 and receptacles 11 are designed so that each part 10 can cooperate with each receptacle 11.

In a first example, indexing elements 7 are designed to allow detectors 8 to determine the identifier of part 10 in receptacle 11 associated with said detectors 8. If the indexing elements 7 of the parts 10 are permanent magnets, then the permanent magnet of each three-dimensional part 10 comprises a magnetization other than the other permanent magnets. Magnetization of a material is characterizable by its magnetic moment volume density and can be measured in amperes per meter.

Hall effect sensors associated with receptacle 11 can therefore:

- determine the position of the permanent magnet as described hereinabove;
- calculate magnetization of the permanent magnet from its known position and its measured magnetic field; and
- determine the identifier of part 10 detected from the magnetization calculated.

In a second example, the three-dimensional part 10 can comprise an RFID tag. Frame 2 then comprises a plurality of RFID sensors, with each RFID sensor associated with a receptacle 11 to read the RFID tag of a part 10 in its receptacle 11. Each RFID tag is associated with an identifier of a part 10. The identifier of part 10 in a receptacle 11 can then be determined from its RFID tag.

Memory

The musical device 1 according to the invention may also comprise a memory, including a memory comprising a set P of music tracks as described hereinbelow. In another embodiment illustrated in FIGS. 2, 3A, 3B and FIG. 10, device 1 includes a connector 6 for the connection of a memory including such a set P of tracks. Connector 6 includes, for example, a USB port or an SD card slot.

Visual Indicator

Musical device 1 can generate information, preferably light information, based on the presence and determined orientation of a part 10 in a receptacle 11. For this purpose, frame 2 may comprise at least one display means. At least one display means may comprise a plurality of luminescent diodes 9, each luminescent diode 9 being associated with a receptacle 11.

In one embodiment illustrated in FIGS. 1 to 3B, the luminescent diodes 9 are arranged on the upper surface 21 of the frame 2. In one alternative embodiment not represented, the luminescent diode 9 can be arranged on the bottom 12 of the receptacle 11. The three-dimensional part 10 then comprises a transparent element (not represented) to scatter light from luminescent diode 9 through said part 10.

Alternatively, the display means comprises a screen to display information about orientations detected of the parts in receptacles 11. The screen can be integrated into frame 2 or be offset 2.

Operating Interface

The musical device 1 according to one embodiment of the invention comprises a control interface 3. The control interface 3 preferably comprises a control knob as illustrated in FIGS. 1 to 4. The control interface 3 can be used to switch the musical device 1 on or off, for example. The control interface 3 also makes it possible to control volume and/or select a set of tracks from multiple sets of tracks stored in the memory. The control interface 3 is preferably arranged on a surface of frame 2, highly preferably on a side wall of frame 2.

Method

Figure 12:
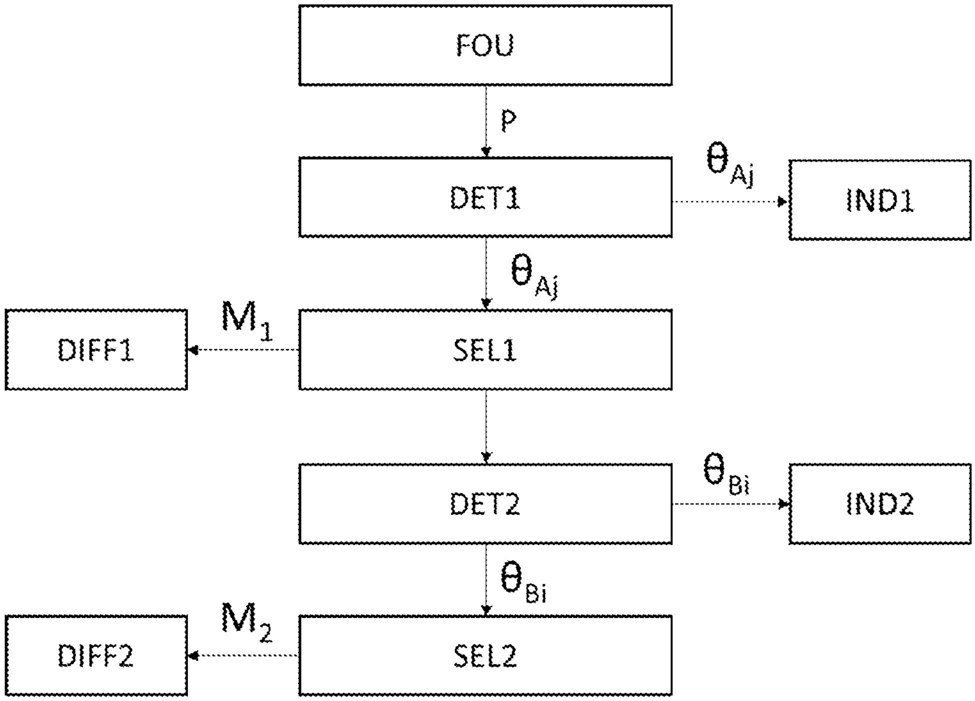
FIG. 12.

One mode of execution of the method for operating a musical device 1 is described hereinbelow, in particular with reference to FIGS. 11 and 12.

Providing a Set of Tracks

The operation of the device comprises a step of providing FOU of a set P of music tracks. The set P of music tracks M is provided to device 1 by said memory or by a memory connected to connector 6.

The set P of music tracks M is comprised of a plurality of music tracks M. The music tracks M of a same set P are designed to be soundly diffused simultaneously and synchronously. Preferably, the music tracks M include melodies or sound sequences with a common tempo or a tempo whose value is a multiple of a common tempo. Preferably, each music track M in a set P comprises a same duration.

Figure 11:
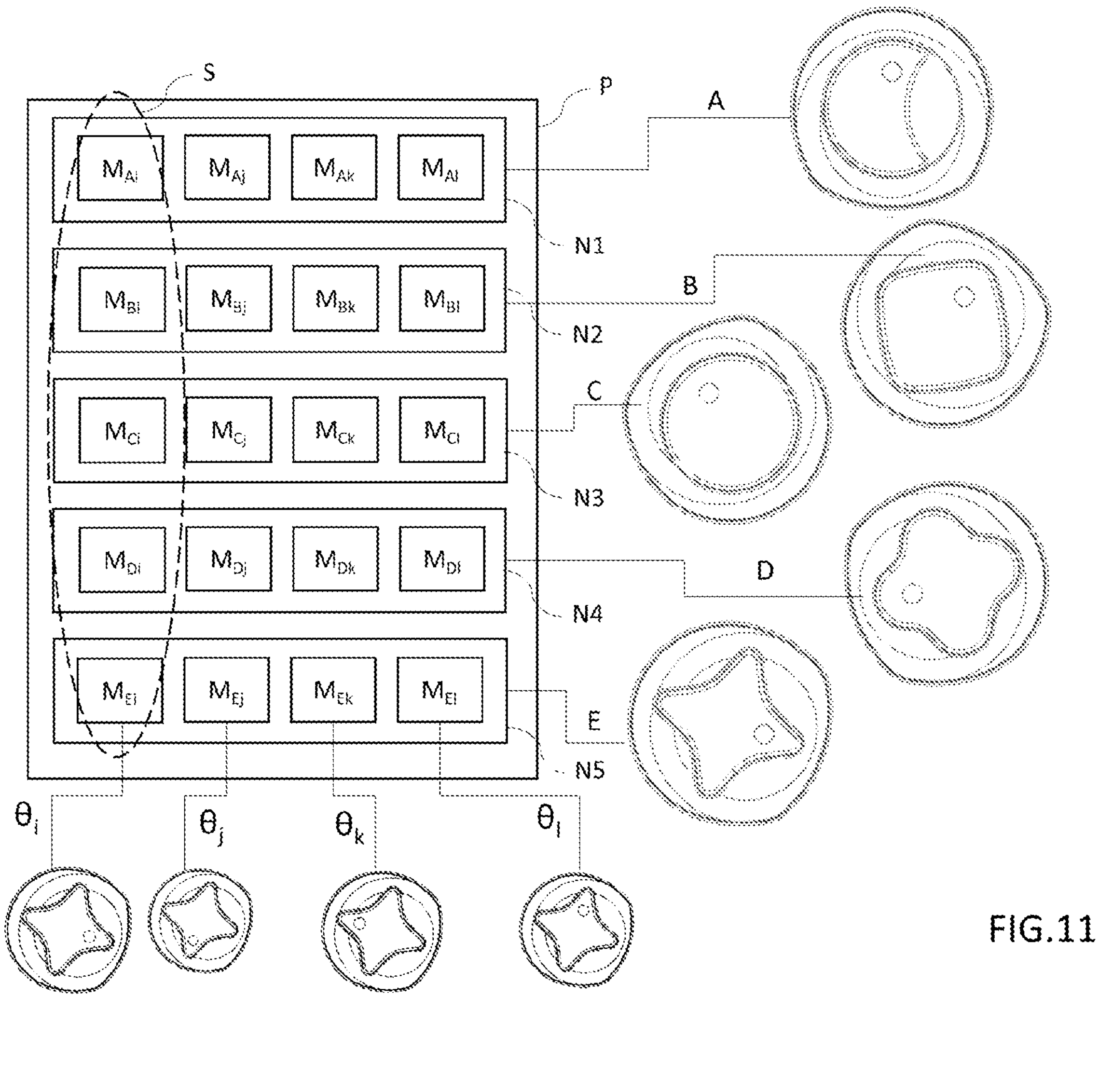
FIG. 11.

Such a set P is illustrated in FIG. 11. The set P comprises a plurality of music tracks M distributed into a plurality of sub-sets N. Each sub-set N comprises at least two music tracks M. Preferably, the set P comprises a number of sub-sets N equal to the number of receptacles 11 in frame 2. Preferably, each sub-set N comprises a number of music tracks M less than or equal to the number of orientations that device 1 may determine and/or the number of different orientations that part 10 may take in a receptacle 11 associated with said sub-set N.

Preferably, each music track M includes a sound sequence of an instrument.

The music tracks M are designed so that when combining the tracks M of a different sub-set, a synchronized and coherent music sequence is achieved.

Preferably, each music track M includes a record of an instrument's sound or a music.

Preferably, the set P comprises groups S of music tracks S from a musical symphonic composition and each instrument or group of instruments is recorded on one of the music tracks M of this group S of music tracks M for selective playing.

In a first example, a musical symphonic composition is a piano concerto. One of the music tracks $M_{Ai}$ then comprises the piano sound of this composition. One of the tracks $M_{Bi}$ includes the accompaniment violin sound of this same composition. One of the tracks $M_{Ei}$ comprises the accompaniment guitar sound of this same composition. One of the tracks $M_{Ci}$ includes the cello sound, and one of the tracks $M_{Di}$ includes the percussion sound of this same composition.

In one embodiment, each sub-set N comprises a music track from that group forming a symphonic musical composition S. In addition, tracks from the same musical composition are preferably organized each in a distinct sub-set N.

The set P shown in FIG. 11 is comprised of 20 music tracks (from $A_{Ai}$ to $M_{Ei}$) distributed into 5 sub-sets (from N1 to N5) of 4 music tracks M each. Preferably, these 20 tracks M come from 4 music symphonic compositions S. Each music symphonic composition S comprises 1 music track M per sub-set.

Preferably, each sub-set N represents a musical function. For example, in the case of 5 N sub-sets, a first sub-set N1 includes music tracks from a solo instrument, a second N2 and third N5 sub-sets may include accompaniment sound tracks. A fourth sub-set N3 includes music tracks including an instrument with a bass function (bass, cello, double bass), a fifth sub-set N4 can include music tracks comprising percussion.

The various symphonic compositions are thereby “compatible”. By compatible, it is meant that they have the same tempo or that their tempo is a multiple of a common tempo. By simultaneously playing one track per sub-set, whether or not from the same musical composition, this will always lead to the music playback of a global symphonic set, the different tracks of which melodically merge with each other.

One advantage of the invention is the ability to compose melodic arrangements, especially by selecting one track per musical function (for example: bass, percussion, soloist, first and second accompaniment), each track M being taken from a different symphonic musical composition B.

Detecting a Part in a Receptacle

A second step comprises detecting DET1 the presence and orientation of a three-dimensional part 10 in a receptacle 11. This step comprises generating and transmitting information about the presence and orientation of a part 10 in each receptacle 11.

This step may comprise generating orientation indicators based on the orientation detected by detectors 8 of each receptacle 11.

For each receptacle A, B, C, D, E, the plurality of detectors 8 determines an orientation $\theta_A$, $\theta_B$, $\theta_C$, $\theta_D$, $\theta_E$ of a part in the receptacle. As previously seen, the orientation of part 10 can be detected by estimating the position of the indexing element 7 of said part 10 in relation to frame 2.

In one embodiment, if the presence of indexing element 7 (thus the three-dimensional part 10) is not detected in receptacle 11, no indicator is generated for this receptacle 11. Alternatively, an indicator of absence of part 10 can be generated in this case.

If the presence of indexing element 7 is detected, the orientation of part 10 in receptacle 11 is determined and an orientation indicator θ is generated.

Preferably, each orientation indicator θ generated comprises at least:

Information on the receptacle in which part 10 has been detected (A, B, C, D, E). This information is obtained using the identifier of detector(s) 8, each detector 8 being associated with a receptacle.

Information about the determined orientation of part 10 in the receptacle (i, j, k, l), determined by the detectors via the indexing element as described previously.

In the example illustrated in FIG. 11, Part 10 in receptacle E can take 4 different orientations: i, j, k or l. The indicator generated therefore corresponds to $\theta_{Ei}$, $\theta_{Ej}$, $\theta_{Ek}$ or $\theta_{Ei}$ respectively.

In one embodiment, the orientation indicator θ generated further comprises the identifier of part 10 inserted into receptacle 11.

Selecting Music Tracks

The method comprises a step of selecting SEL1 a first music track $M_1$ to be soundly diffused. The first music track $M_1$ to be soundly diffused is selected from the set P of music tracks M. This selection is made automatically once orientation of the part is detected.

The first music track $M_1$ is selected from receptacle 11 in which a part 10 has been detected and from the determined orientation of said part 10 in said receptacle 11. The first music track $M_1$ is selected from the information of the indicator θ generated, preferably information on the receptacle (A, B, C, D, E).

As illustrated in FIG. 11, the information on the receptacle (A, B, C, D, E) in which the part 10 has been inserted allows the selection of a sub-set N of music tracks. For example, if the receptacle in which a part 10 has been inserted is receptacle E, the first track $M_1$ will be selected from the sub-set M5 associated therewith comprising the tracks $M_{Ei}$, $M_{Ej}$, $M_{Ek}$, $M_{El}$.

The first music track $M_1$ is selected according to the orientation of the part 10 in the receptacle (i, j, k, l). The first music track $M_1$ is selected from the information of the indicator θ generated, preferably information on the orientation (i, j, k, l).

As illustrated in FIG. 11, the information on the orientation (i, j, k, l) in which the part 10 has been inserted allows a music track to be selected from those of the sub-set selected.

For example, if the part 11 into which a part 10 has been inserted is receptacle E in orientation k, the first track $M_1$ will be $M_{Ek}$.

In one embodiment, swapping orientation of part 10 in receptacle 11 thereby allows the music track M selected to be modified. This swapping can also be used to select the symphonic composition S from which the selected music track has been extracted.

In one embodiment, the first track $M_1$ can also be selected based on the identifier of part 10 cooperating with receptacle 11, especially when a receptacle 11 is adapted to receive several parts and the plurality of detectors allows determination of the identifier of the part cooperating with the part cooperating with the receptacle associated.

In one embodiment not represented, the track(s) M selected can be chosen from the set P of tracks based on the determined identifier of the three-dimensional part 10 detected in a receptacle. In this mode, each sub-set N comprises at least two subdivisions comprising each of the music tracks. Each subdivision is associated with one identifier of three-dimensional part 10. This advantageously increases the number of selectable tracks M from receptacle 11, by selecting a track M based on receptacle 11, orientation of the part, and also based on the determined identifier of the part.

Sound Diffusion of the First Track

The method comprises a step of the sound diffusion DIFF1 of the first music track $M_1$ selected. This playback DIFF1 is automatically carried out once the first music track $M_1$ is selected.

The first music track $M_1$ can be soundly diffused via the audio system 5 and/or through the audio output interface 51 of the musical device 1.

Preferably, the first music track $M_1$ is soundly diffused from the beginning. Preferably, the first music track $M_1$ is soundly diffused automatically when the orientation of a first part 10 in a first receptacle 11 is detected.

Second Music Track

The method comprises detecting DET2 the presence and orientation of a second three-dimensional part 10 in a second receptacle 11. This step is similar to detecting DET1 the presence and orientation of the first three-dimensional part 10 in the first receptacle 11.

The method also comprises selecting SEL2 a second music track $M_2$ to be soundly diffused. This step SE2 is similar to the step of selecting SE1 the first music track $M_1$.

The second music track $M_2$ to be soundly diffused is selected from a second sub-set N, different from the first sub-set of music tracks. Indeed, each sub-set N of the set of music tracks is associated with only one receptacle.

Sound Diffusion of the Second Music Track

Once selected, device 1 automatically triggers the sound diffusion DIFF2 of said second music track $M_2$.

Said second music track $M_2$ is soundly diffused simultaneously with the first track.

The second music track $M_2$ is soundly diffused simultaneously with the first music track $M_1$ in a temporally synchronized manner. Preferably, the second music track $M_2$ is soundly diffused automatically when the orientation of a second part 10 in a second receptacle 11 is detected.

When a second music track $M_2$ is selected, its sound diffusion is added to the sound diffusion of the first music track in a synchronized manner.

The time synchronization with the first music track $M_1$ can comprise synchronization of the bar of the second music track $M_2$ with the bar of the first music track $M_1$ so that the notes of the second music track $M_2$ blend into the melody of the first music track $M_1$ without modifying the sound diffusion of the music track $M_1$.

In one embodiment, the sound diffusion DIFF 2 of the second music track $M_2$ is triggered at the same time location as the time location of the first music track $M_1$ upon triggering the sound diffusion of the second track. By time location, it is meant a date or duration since the beginning of the music track.

For example, if when the sound of the second music track $M_2$ is triggered, the sound diffusion of the first music track $M_1$ is at a time location of 35 seconds (that is the time between the beginning of the track and the currently soundly diffused instant is 35 seconds), then the music track $M_2$ is soundly diffused starting directly at 35 seconds so that its sound diffusion is synchronized in time with the sound diffusion of the first music track $M_1$.

In one embodiment, the method comprises a step of starting all the music tracks M of set P simultaneously. All tracks M are played, for example by a means for playing an audio file. All tracks M of set P are played simultaneously from the same date or location, advantageously guaranteeing synchronization between all tracks M.

The volume of each music track M is then individually variable. The volume of each M is variable between at least a first volume and a second volume in which the first volume corresponds to a so-called "mute" volume preventing its playback and in which the second volume generates its sound diffusion. When starting all music tracks, the volume of all music tracks M is adjusted to the first volume. The playback of a selected track includes a step of modifying the track volume from the first volume to the second volume for its sound diffusion.

When an orientation of a part is detected in a receptacle, the device automatically modifies the volume of the track associated with that receptacle and said orientation to the second volume for generating the sound diffusion of said track associated.

This embodiment advantageously improves the response time between the selection of the music track and its sound diffusion synchronously with the first sound track.

In one embodiment, the step of starting all music tracks simultaneously is triggered by selecting SEL1 the first music track, by the detection step DET1, or by the step of the sound diffusion of the first track DIFF1. In another embodiment, the step of starting all music tracks is controlled by the control interface 3. This advantageously allows the first track to be soundly diffused from the beginning when the device is switched on or when a first part is inserted into a receptacle.

Similarly, device 1 allows the sound playback of a plurality of sound tracks M simultaneously and synchronously by increasing the number of receptacles 11 receiving a part 10. Preferably, the method comprises sound playing back a number of music tracks equal to the number of receptacles 11 in which a part is detected.

In one embodiment, when removing a part 10 from a receptacle 11, detectors 8 no longer detect its presence and the corresponding track M selected is then no longer soundly diffused.

Similarly, if detectors 8 determine an orientation swap of a part, the corresponding selected track is no longer soundly diffused, and a new music track corresponding to the new orientation is then selected and soundly diffused as described above.

The method and musical device according to the invention thus allow simultaneous and synchronized sound diffusion of several music tracks forming a symphony, to add, remove or replace a music track as much as desired without stopping said symphony.

The method may include a prior step of pre-selecting a set of music tracks from a plurality of music tracks and providing the set P selected. In one example, the memory connected to connector 6 may comprise a plurality of sets P. Selection of a set P can be made by the control interface 3, for example by a control knob.

Calculation System

Musical device 1 comprises hardware and/or software means to implement the steps of the method described hereinabove.

For this purpose, the musical device may include a calculation system K.

The calculation system K comprises a calculator CALC. The calculator CALC contains software elements for implementing the method described hereafter. Preferably, a calculator CALC is connected to a second MEM memory containing instructions readable and executable by the calculator CALC, in particular for the implementation of the method described below.

The control system K also includes an audio processor KLT. The audio processor KLT is connected to the calculator CALC. The audio processor KLT is also connected to the audio system 5 and/or an audio output interface 51.

The control system K is also connected to a memory containing a set P of music tracks M or to connector 6 for connection to such a memory. Preferably, the audio processor KLT is connected to said memory or said connector 6.

The calculator CALC is connected to sensors 8 to receive orientation data from parts 7 in receptacles 11. Preferably, the calculator CALC is connected to the control interface 3 to receive control information from the control interface 3. The calculator can also be connected to the indicator 9 to transmit information to be displayed.

Preferably, the set P of tracks M is provided to the audio processor KLT via connector 6 or via a memory integrated into musical device 1, for example in the frame.

The calculator CALC receives information from the plurality of detectors 8. The calculator is configured to select music tracks M from the information from the plurality of detectors 8. The calculator can generate the orientation indicators θ. In another embodiment, detectors 8 each generate their orientation indicator θ and transmit it to the calculator CALC.

The selected track(s) is (are) transmitted to the audio processor KLT. The audio processor KLT allows sound diffusion of the selected track(s) by the audio system 5, 51. The audio processor KLT is configured to play music tracks simultaneously and synchronously as described hereinabove.

In addition, the calculation system is connected to the display means to display information relating to the orientation of the parts in the receptacles. In one embodiment, each time an orientation of a part is detected, an indicator light representative of the orientation and the receptacle is generated IND1, IND2.

Device 1 may also comprise a power supply, in particular to power the audio system 5, 51, the calculation system K and/or the display means 9.

The invention claimed is:

1. A musical device comprising:

a frame comprising a plurality of receptacles for receiving three-dimensional parts each comprising a face, each part of the three-dimensional parts being capable of swapping between at least two orientations in at least one receptacle of said plurality of receptacles, each part of the three-dimensional parts including an indexing element of the orientation of the part among the at least two orientations, a plurality of detectors, each detector being associated with a receptacle of the plurality of receptacles to determine the orientation of the part through detection of an indexing element in its receptacle, and at least one audio system, wherein insertion of at least two parts into their respective receptacle triggers sound diffusion by the audio system of at least two music tracks simultaneously, said at least two music tracks being selected from a set of music tracks based on each of the orientations of said at least two parts determined such that, for each of the at least two parts, a first orientation of the at least two orientations is associated with a first music track of the set of music tracks and a second orientation of the at least two orientations is associated with a second music track of the set of music tracks that is different from the first music track, and wherein the device further comprises a calculation system to ensure synchronization of the music tracks soundly diffused simultaneously.

2. The musical device according to claim 1, wherein each receptacle comprises a receiving cavity forming a geometric shape for receiving a part of a predefined geometric shape.

3. The musical device according to claim 1, wherein the frame comprises recesses for receiving a receptacle in a removable manner, and each receptacle comprises a receiving recess forming a geometric shape for receiving a part of a predefined geometric shape.

4. The musical device according to claim 1, wherein the plurality of detectors comprises a plurality of Hall effect sensors and the indexing elements comprise permanent magnets.

5. The musical device according to claim 1, comprising a display, the computing system being configured for the display to output information relating to the orientation of a part in a receptacle.

6. The musical device according to claim 1, comprising a plurality of parts adapted to cooperate with said receptacles and wherein each part includes a permanent magnet arranged between a center of the part is a radial end of said part.

7. A musical device comprising:

a frame comprising a plurality of receptacles for receiving three-dimensional parts each comprising a face, each part of the three-dimensional parts being that is capable of swapping between at least two orientations in at least one receptacle of said plurality of receptacles, each part of the three-dimensional parts including an indexing element of the orientation of the part among the at least two orientations, a plurality of detectors, each detector being associated with a receptacle of the plurality of receptacles to determine the orientation of the part through detection of an indexing element in its receptacle, and at least one audio system, wherein insertion of at least two parts into their respective receptacle triggers sound diffusion by the audio system of at least two music tracks simultaneously, said at least two music tracks being selected from a set of music tracks based on each of the orientations of said at least two parts determined, wherein the device further comprises a calculation system to ensure synchronization of the music tracks soundly diffused simultaneously, and wherein the calculation system is configured to ensure synchronization in the following manner:

simultaneously starting playing of all music tracks of the set of music tracks, a volume of each track being individually adjustable between at least two volumes: a first volume corresponding to a zero volume preventing sound diffusion of the track and a second volume allowing sound diffusion of the track;

adjusting the volume of all music tracks to the first volume preventing sound diffusion thereof;

and wherein triggering the sound diffusion of a selected music track includes automatically modifying the volume of the music track to the second volume.

8. A method for playing back several music tracks simultaneously and synchronously, the method comprising:

providing a set of music tracks comprising a plurality of sub-sets of music tracks, each sub-set being associated with a receptacle of a musical device, each receptacle being designed for receiving at least one three-dimensional part of a plurality of three-dimensional parts each including a face, each part of the three-dimensional parts being capable of swapping between at least two orientations in said receptacle;

detecting a presence and orientation of a first three-dimensional part in a first receptacle;

selecting a first music track from a first sub-set of music tracks associated with said first receptacle based on the orientation of the three-dimensional part in the first receptacle so that a music track that is different from said first music track is selected when the orientation of said first three-dimensional part is modified in said first receptacle;

sound diffusing the first music track selected;

detecting a presence and orientation of a second three-dimensional part in a second receptacle;

selecting a second music track from a second sub-set associated with said second receptacle based on the orientation of the three-dimensional part in the second receptacle so that a music track that is different from said second music track is selected when the orientation of said second three-dimensional part is modified in said second receptacle;

sound diffusing the second music track selected, the second music track being soundly diffused simultaneously and synchronously with the first music track.

9. The method according to claim 8, wherein the synchronization of the sound diffusion of the music tracks selected is ensured by:

simultaneously starting playing of all music tracks of the set of music tracks, the volume of each track being individually adjustable between at least two volumes: a first volume corresponding to a zero volume preventing sound diffusion of the track and a second volume allowing sound diffusion of the track;

adjusting the volume of all music tracks to the first volume preventing sound diffusion thereof, and when the first and/or second music track is selected, automatically modifying the volume of the first and/or second music track selected from the first volume to the second volume for its sound diffusion.

10. The method according to claim 9, comprising:

detecting swapping of orientation of the first three-dimensional part in a second receptacle;

selecting a third music track from the first sub-set based on the new orientation of the three-dimensional part in the first receptacle;

stopping sound diffusion of the first music track, and the sound diffusion of the third music track selected, the third music track being soundly diffused simultaneously and synchronously with the second music track.

11. The method according to claim 10, wherein stopping sound diffusion of the first music track is carried out by automatically modifying the volume setting of said first music track from the second volume to the first volume to stop its sound diffusion as soon as said first music track is no longer selected.

* * * * *